US011930346B2

(12) United States Patent
Scheek et al.

(10) Patent No.: US 11,930,346 B2
(45) Date of Patent: Mar. 12, 2024

(54) SPEAKER TRANSDUCER

(71) Applicant: Mayht Holding B.V., Santa Barbara, CA (US)

(72) Inventors: Timothy Ruben Scheek, Rotterdam (NL); Onno Hein Steenhuis, Rotterdam (NL); Naphur van Apeldoorn, Amsterdam (NL)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 18/309,544

(22) Filed: Apr. 28, 2023

(65) Prior Publication Data

US 2023/0345181 A1 Oct. 26, 2023

Related U.S. Application Data

(63) Continuation of application No. PCT/NL2020/050685, filed on Nov. 4, 2020.

(51) Int. Cl.

| | |
|---|---|
| ***H04R 9/06*** | (2006.01) |
| ***H04R 1/40*** | (2006.01) |
| ***H04R 7/06*** | (2006.01) |
| ***H04R 7/18*** | (2006.01) |
| ***H04R 9/04*** | (2006.01) |

(52) U.S. Cl.

CPC ............ *H04R 9/063* (2013.01); *H04R 1/403* (2013.01); *H04R 7/06* (2013.01); *H04R 7/18* (2013.01); *H04R 9/046* (2013.01); *H04R 9/06* (2013.01); *H04R 2209/026* (2013.01); *H04R 2400/11* (2013.01); *H04R 2499/11* (2013.01)

(58) Field of Classification Search

CPC . H04R 1/403; H04R 7/06; H04R 7/18; H04R 7/20; H04R 9/043; H04R 9/046; H04R 9/06; H04R 9/063; H04R 2209/026; H04R 2400/11; H04R 2499/11

See application file for complete search history.

(56) References Cited

U.S. PATENT DOCUMENTS 4,191,863 A * 3/1980 Matsuda ................ H04R 9/063 381/431
11,297,415 B2 * 4/2022 Scheek .................... H04R 9/04
2005/0031153 A1 2/2005 Nguyen et al.
2011/0158462 A1 6/2011 Horigome et al.
2018/0048963 A1 2/2018 Pan et al.
2020/0344554 A1 * 10/2020 Scheek .................... H04R 7/18

FOREIGN PATENT DOCUMENTS

WO 2019117706 A1 6/2019

OTHER PUBLICATIONS

International Preliminary Report on Patentability dated Apr. 4, 2022; International Application No. PCT/NL2020/050685; 7 pages.

* cited by examiner

*Primary Examiner* — Huyen D Le

(74) *Attorney, Agent, or Firm* — Fortem IP LLP; Matt Lincicum

(57) ABSTRACT

A speaker transducer, comprising a speaker membrane and two drive members connected to an outer membrane circumference of the speaker membrane for driving the speaker membrane. A substantially rigid support member is connected to each of the two drive members and extends there between, wherein the support member is connected to and extends along the speaker membrane.

14 Claims, 2 Drawing Sheets

SPEAKER TRANSDUCER

CROSS-REFERENCE TO RELATED APPLICATION

The present application is a continuation of International Application No. PCT/NL2020/050685, filed Nov. 4, 2020, which is incorporated herein by reference in its entirety.

FIELD OF THE INVENTION

The present invention relates to a speaker transducer for e.g. loud speaker systems.

BACKGROUND

Speaker transducers are well known in the prior art, such as speaker transducers comprising a cone shape speaker membrane and a membrane driver or actuator coaxially arranged with respect to the speaker membrane at a back side thereof.

Planar type speaker transducers are also known in the art, wherein the speaker transducer comprise a planar speaker membrane and a plurality of membrane drivers arranged along a surface of the speaker membrane.

Although the well-known coaxial cone shaped speaker transducers allow for high performance and fidelity, they are less suitable for smaller loud speaker systems due to the coaxial arrangement of the speaker membrane and membrane driver. Planar type speaker transducers do allow for flatter loudspeaker designs because of the substantially flat speaker membrane.

International patent publication WO2019/117706 discloses a speaker device having a frame, two opposite directed diaphragms, and two speaker drivers, each having at least one magnetic driver for driving the two opposite directed diaphragms in operation. A speaker damper is associated with each of the two opposite directed diaphragms, and has a coil bracket arranged to be driven by the associated at least one magnetic driver, a diaphragm connection member arranged to fixedly attach the diaphragm to the speaker damper, and a damper frame connection member arranged to fixate the speaker damper to the frame. The speaker damper further comprises a damper leg member arranged between the diaphragm connection member and the damper frame connection member.

SUMMARY

The present invention seeks to provide an improved speaker transducer that allows for a light weight, durable and an even smaller form factor loudspeaker design with excellent performance and sound fidelity.

According to the present invention, a speaker transducer of the type mentioned in the preamble is provided comprising a speaker membrane and two drive members connected to an outer membrane circumference of the speaker membrane for driving the speaker membrane, and a substantially rigid support member connected to each of the two drive members and extending there between, wherein the support member is connected to and extends along the speaker membrane.

According to the present invention, the support member attaches to and extends along the speaker membrane so that rigidity of the speaker membrane is increased. In particular, because the speaker membrane is driven only at its outer membrane circumference during operation, this tends to deform the speaker membrane due to driving forces being concentrated and localised at the outer membrane circumference. The support member of the present invention allows driving forces (e.g. push/pull) acting on the outer membrane circumference to be distributed and diffused along the speaker membrane. Because the speaker membrane is reinforced by the support member, this increases durability of the speaker transducer, improves the performance of membrane rigidity and membrane break-up frequency, and reduces the chance to get “rub-and-buzz”.

In an advantageous embodiment, the support member extends along one or both sides of the speaker membrane, so that a particular rigidity and as such a particular dynamic behaviour of the speaker membrane can be achieved. Also, the available space for the speaker transducer in a particular application may allow for a support member on just one or both sides of the speaker membrane.

In an exemplary embodiment, the support member comprises one or more fin/rib portions extending between the two drive members, and wherein each fin/rib portion is attached to the speaker membrane and projects away therefrom substantially perpendicular. In this embodiment each of the fin portions may be seen as a relatively thin, flat portion of the support member that attaches to and extends along the speaker membrane between the two drive members, and wherein each fin portion projects away from the speaker membrane in a direction parallel to the direction of motion of the speaker membrane during operation. By extending away substantially perpendicular to the speaker membrane maximizes the rigidity that each of the fin portions can provide to the speaker membrane. Furthermore, perpendicularly arranged fin portions on the speaker membrane preserve a maximum surface area of the speaker membrane for moving air. Moreover, each of the fin portions minimizes the added weight to a total moving weight of the speaker transducer.

In a further exemplary embodiment, each fin portion has a fin height, as measured from the speaker membrane, wherein the fin height is at least three time a thickness of the speaker membrane. This embodiment ensures that each fin portion provides sufficient rigidity to the speaker membrane but minimizes added weight to the total moving weight of the speaker transducer.

SHORT DESCRIPTION OF DRAWINGS

The present invention will be discussed in more detail below, with reference to the attached drawings, in which FIG. 1 shows a side view of the speaker transducer according to an embodiment of the present invention;

FIG. 3 shows a first perspective view of the speaker transducer according to an embodiment of the present invention; and wherein

DESCRIPTION OF EMBODIMENTS

Figure 1:
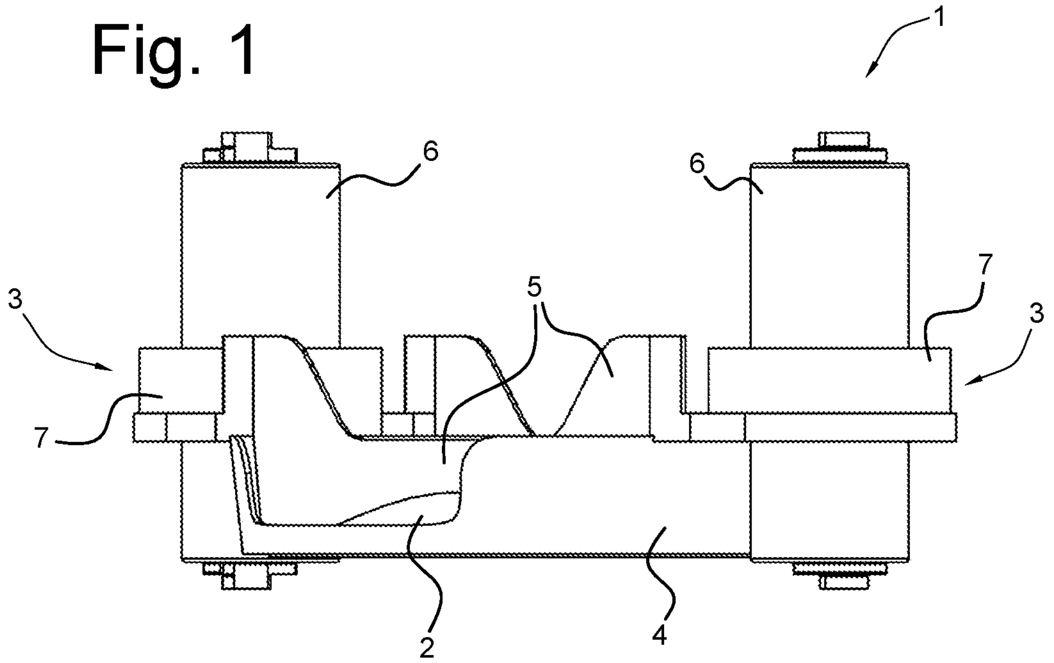
Figure 2:
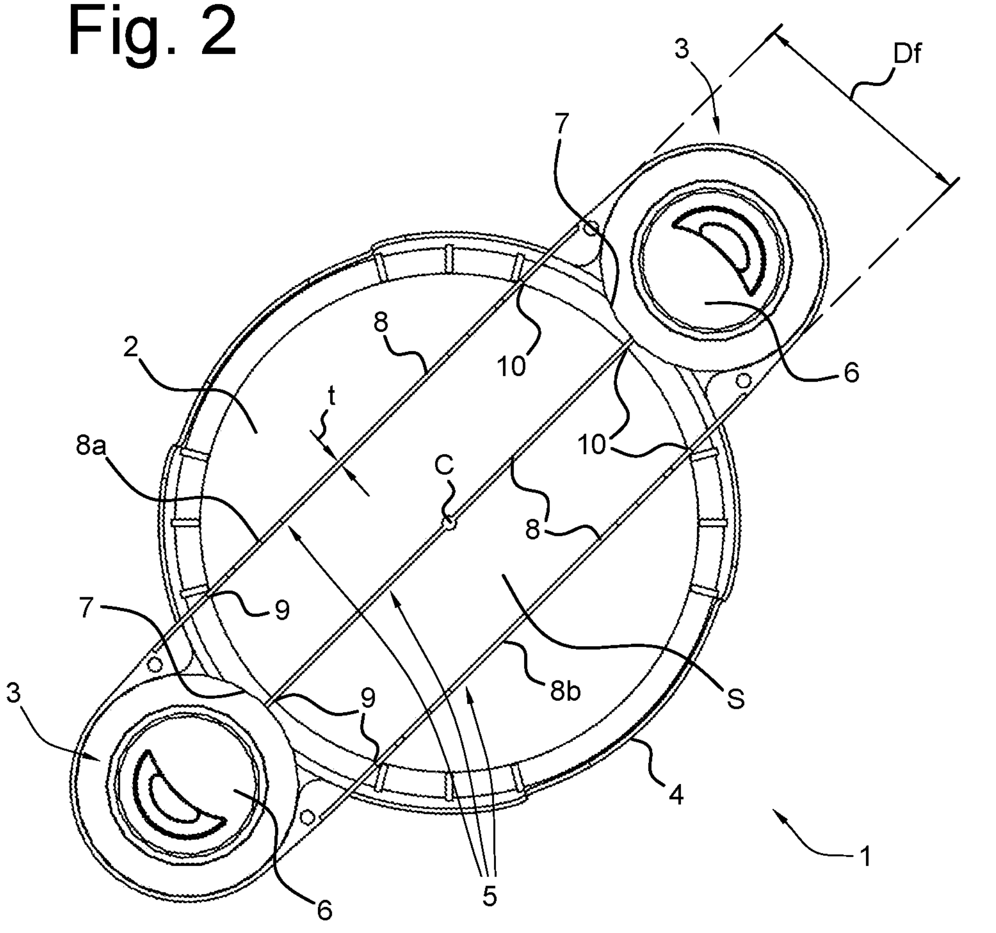
FIG. 2 shows a top view of the speaker transducer according to an embodiment of the present invention.
Figure 3:
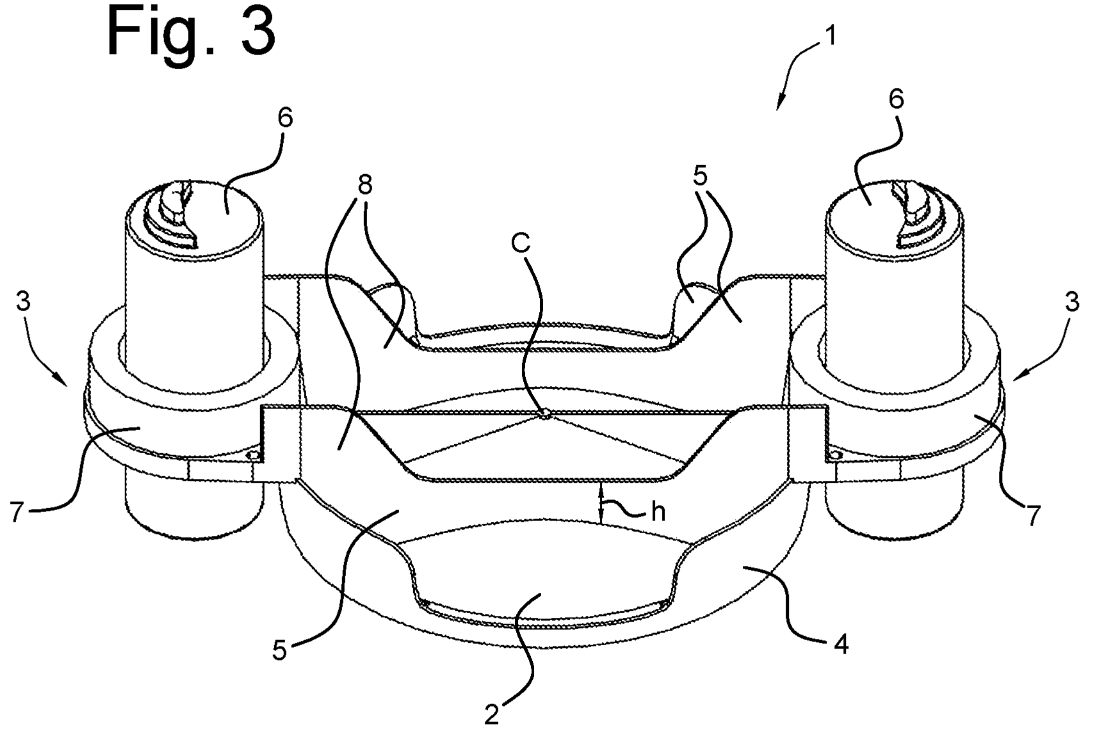

FIGS. 1 to 3 each show a side, top and perspective view of a speaker transducer 1 according to an embodiment of the present invention. As depicted, the speaker transducer comprises a speaker membrane 2 and two drive members 3 connected to an outer membrane circumference 4 of the speaker membrane 2 for driving the speaker membrane 2, and a substantially rigid support member 5 connected to each of the two drive members 3 and extending there between, wherein the support member 5 is connected to and extends along the speaker membrane 2. Such an assembly of a speaker transducer could e.g. be used in a speaker device as described in the international patent publication WO2019/117706 of the same inventors as the present application, and which is incorporated herein by reference.

As depicted, the support member 5 attaches to and extends along the speaker membrane 2, so that rigidity of the speaker membrane 2 is increased. In particular, because the speaker membrane 2 is driven only at its outer membrane circumference 4 during operation, this tends to deform the speaker membrane due to driving forces being concentrated and localised at the outer membrane circumference 4. However, the support member 5 allows drive forces (e.g. push/pull) acting on the outer membrane circumference 4 to be distributed and diffused along the speaker membrane 2. Therefore, the speaker membrane 2 is reinforced by the support member 5 and this increases durability of the speaker membrane 2, improves the performance of membrane break-up frequency, and the chance of "rub-and-buzz" is reduced.

The support member 5 is particularly advantageous when the speaker membrane 2 is a planar membrane, which may otherwise show too much deformation without the support member 5. Note that the support member 5 is equally advantageous for a conic shaped speaker membrane 2 when requiring structural reinforcement to achieve optimal dynamic behaviour and minimize deformation when the speaker transducer 1 is in use.

In a typical embodiment, each of the two drive members 3 is arranged to interact with a complementary drive member 6, such as a permanent magnet or electronically controlled magnet (e.g. voice coil). So in an embodiment, each of the drive members 3 may comprise a permanent magnet or a voice coil for interaction with a complementary voice coil or permanent magnet respectively. This allows for design flexibility as to whether each of the drive members 3 is an active or passive drive member for driving the speaker membrane 2.

In case each of the drive members 3 comprises a voice coil, then an advantageous embodiment is provided wherein the voice coils are connected through a wired connection extending along the support member 5.

In an embodiment, each of the two drive members 3 is a ring shaped drive member 3, and wherein an outer driver circumference 7 of each ring shaped drive member 3 is connected to the outer membrane circumference 4 of the speaker membrane 2. In this embodiment a fully eccentric arrangement is achieved, see FIG. 2, between the speaker membrane 2 and each of the drive members 3 connected "side-by-side" to the outer membrane circumference 4. As a result, the speaker membrane 2 and each of the drive members 3 are arranged in a substantially flat shaped volume, yielding a flat speaker transducer 1. Then by virtue of the substantially rigid support member 5, drive forces from each of the drive members 3 acting on the outer membrane circumference 4 are distributed along the speaker membrane 2 for optimal dynamic behaviour thereof. It is worth noting that, due to the flat eccentric arrangement, larger displacements or excursions of the speaker transducer 1 are possible for a given space, thereby further optimising performance of the speaker transducer 1.

Let a longitudinal direction be defined in a direction of motion of the speaker membrane 2 during operation, then this embodiment clearly avoids the space consuming coaxial arrangement of a speaker membrane and a membrane driver of the prior art.

As further depicted in e.g. FIG. 2, the two drive members 3 may be oppositely arranged along the outer membrane circumference 4, so that localised drive forces acting on the outer membrane circumference 4 are evenly distributed there along. That is, this embodiment may be seen as where two opposing sections of the outer membrane circumference 4 between the two drive members 3 are substantially the same length. As such, an imaginary straight line drawn between the two drive members 3 passes through a centre point "C" of the speaker membrane 2. Should the support member 5 be a straight support member, for example, then it would connect the two drive members 3 along a shortest path and maximise rigidity there between.

Coming back the complementary drive member 6, it can be observed from the FIGS. 1-3 that in an embodiment each of the ring shaped drive members 3 may be arranged to receive a complementary drive member 6 extending there through, wherein each of the two complementary drive members 6 may be a cylindrical complementary drive member 6. By choosing a suitable length for each of the cylindrical complementary drive members 6, it is readily seen that a plurality of speaker transducers 1 may be used, each of which utilises two ring shaped drive members 3 interacting with the two complementary drive members 6 accordingly. The plurality of speaker transducers 1 may then be arranged in longitudinal fashion, sharing the two cylindrical complementary drive members 6. This would allow for e.g. a "back to back" arrangement (not shown) with minimal dimensions but optimal performance.

As depicted in FIG. 3, in an embodiment the support member 5 may extend along one side of the speaker membrane 2 only, so wherein the support member 5 does not extend along the non-visible side of the speaker membrane 2. This embodiment may be advantageous when one-sided support is sufficient and, possibly, there is no space for the support member 5 along the non-visible side.

Figure 4:
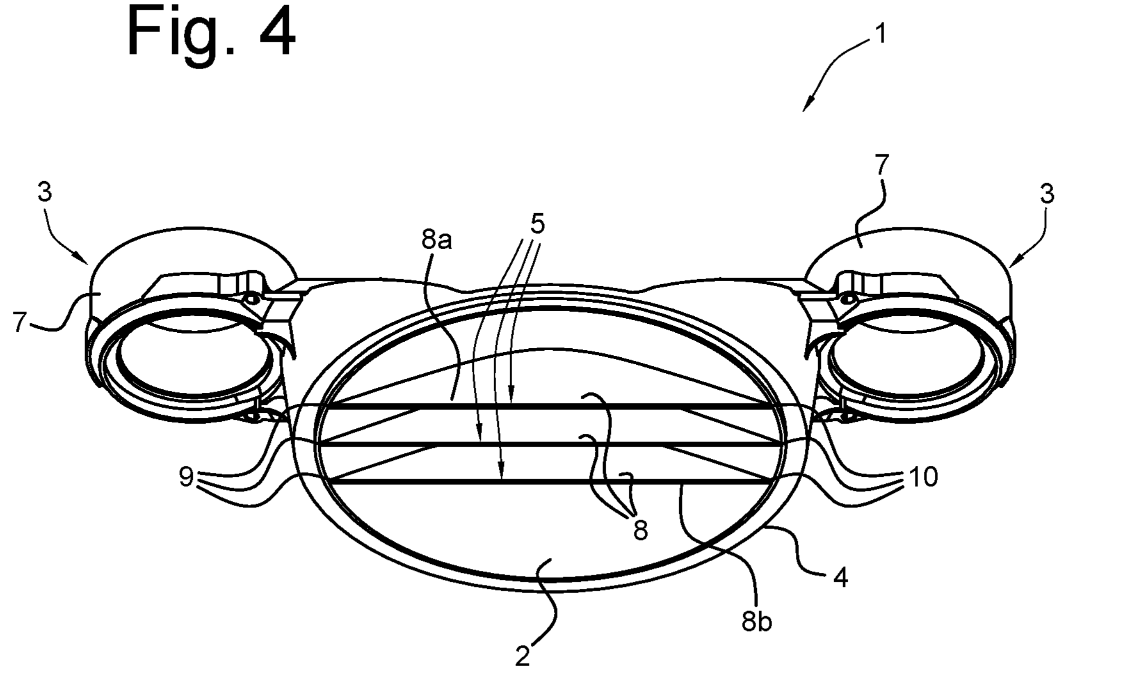
FIG. 4 shows a second perspective view of the speaker transducer according to an embodiment of the present invention.

FIG. 4 shows a second perspective view of the speaker transducer 1 according to an embodiment of the present invention. As depicted, in this embodiment the support member 5 is attached to and extends along the opposing side of the speaker membrane 1 as seen from FIG. 3. So in an advantageous embodiment the support member 5 may extend along both sides of the speaker membrane 2 for optimal rigidity, hence improving performance.

The support member 5 may be implemented in various ways. For example, in an embodiment the support member 5 may comprise one or more fin portions 8 extending between the two drive members 3, and wherein each fin portion 8 is attached to the speaker membrane 2 and projects away therefrom substantially perpendicular.

In this embodiment each of the fin portions 8 may be seen as a relatively thin, flat portion of the support member 5 that attaches to and extends along the speaker membrane 2 between the two drive members 3, and wherein each fin portion 8 projects away from the speaker membrane 2 in longitudinal direction, i.e. a direction parallel to the direction of motion of the speaker membrane 2 during operation. By extending away substantially perpendicular to the speaker membrane 2 maximizes the rigidity that each of the fin portions 8 can provide to the speaker membrane. Furthermore, perpendicularly arranged fin portions 8 on the speaker membrane 2 preserve a maximum surface area S of the speaker membrane 2 for moving air, hence maintaining high performance. Moreover, each of the fin portions 8 minimizes the added weight to a total moving weight of the speaker transducer 1.

In exemplary embodiment, each of the fin portions 8 has a thickness t substantially equal to a thickness of the speaker membrane 2. This maximizes the surface area S of the speaker membrane 2 to displace air whilst still providing sufficient structural rigidity to the speaker membrane 2. Furthermore, thickness t provides favourable dimensions for high quality, high speed manufacturing of the diaphragm.

In a further exemplary embodiment, each of the fin portions 8 has a fin height h, as measured from the speaker membrane 2, wherein the fin height h is at least three time the thickness of the speaker membrane 2. This also ensures sufficient rigidity of the speaker membrane 2 whilst providing a flat speaker transducer 1. It is worth noting that the fin height h may be limited by, for example, a physical object close to the speaker transducer 1 to avoid collision therewith when the speaker transducer 1 is in use. Such a physical object could also be a further speaker transducer 1 as mentioned above to obtain a "back to back" arrangement of two speaker transducers 1. Such a physical object could also be an object located between two opposing speaker transducers 1 in such a "back to back" arrangement.

As further depicted in FIG. 2, in an embodiment each of the one or more fin portions 8 may be a straight fin portion, thereby achieving short fin portions 8 with maximum bending resistance but still good force distribution and diffusion along the speaker membrane 2. In a specific embodiment, one fin portion of the one or more fin portions 8 may extend through a centre point C of the speaker membrane 2 to achieve a shortest fin portion for maximum rigidity.

In a further embodiment, each of the one or more fin portions 8 may extend from a first circumferential part 9 of the outer membrane circumference 4 to a second circumferential part 10 of the outer membrane circumference 4. In this embodiment, which is e.g. depicted in FIG. 2, each of the fin portions 8 fully extends along the speaker membrane 2 between two locations on the outer membrane circumference 4. That is, each of the fin portions 8 fully spans the speaker membrane 2 from the first to the second circumferential part 9, 10. This embodiment ensures that the support member 5 maintain as much surface area S as possible and where each fin portion 8 effectively contributes to the rigidity of the speaker membrane 2. Of course, in this embodiment it is understood that the first and second circumferential parts 9, 10 are different.

In an exemplary embodiment, as depicted in FIG. 2, the support member 5 may comprise a plurality of the fin portions 8 as mentioned above, and wherein the plurality of these fin portions 8 form a parallel extending arrangement of fin portions 8. This parallel arrangement between the two drive members 3 further contributes to optimal distribution and diffusion of drive forces along the speaker membrane 2 imposed on the outer membrane circumference 4. Furthermore, the parallel extending arrangement increases torsional stiffness of the speaker membrane 2.

In the embodiment of FIG. 2 it is further depicted that two fin portions 8*a*, 8*b* of the plurality of the fin portions 8 may be spaced apart at a separation distance Df which is equal to or larger than a diameter of the outer driver circumference 7 of each drive member 3. This allows for both straight or arcuate fin portion 8*a*, 8*b* being directly connected to each of the two drive members 3 whilst also being separated maximally for optimal drive force distribution along the speaker membrane 2. FIG. 2 shows an exemplary embodiment where each of the two fin portions 8*a*, 8*b* are straight fin portion for a shortest span along the speaker membrane 2 and for maximum rigidity. However, in alternative embodiments it is conceivable that each of these fin portions 8*a*, 8*b* extend along the speaker membrane 2 in arcuate manner to achieve a desired force distribution along the speaker membrane 2.

Regardless of how the one or more fin portions 8 mentioned above are arranged between the two drive members 3, in case each of the two drive members 3 comprises a voice coil, then these voice coils may be connected through a wired connection extending along one or more of the one or more fin portions 8.

It is worth noting that the support member 5 and the speaker membrane 2 may be integrally formed and thus form a unitary piece for maximum stiffness of the speaker member 2. So in an advantageous embodiment the one or more fin portions 8 may also be integrally formed with the speaker membrane 2 to maximise rigidity and hence improve dynamic performance.

According to the present invention, it is certainly conceivable that more than two drive members 3 can be arranged along and connected to the outer membrane circumference 4 of the speaker membrane 2 (not shown). In such cases the support member 5 may extend in various ways between the more than two drive members 3. For example, in an embodiment the speaker transducer 1 may comprise three drive members 3 connected to and evenly spread along the outer membrane circumference 4 of the speaker membrane 2. The substantially rigid support member 5 may then be connected to a first and a second drive member of the three drive members 3, and to the first and a third drive member of the three drive members 3. In this way a Y-shaped support member 5 is obtained attached to and extending along the speaker membrane 2 for optimal drive force distribution and rigidity of the speaker membrane 2. Then in analogous fashion to the embodiments described above, the Y-shaped support member 5 may comprise one or more fin portions 8 extending between the first and second drive member and the first and third drive member. Likewise, each fin portion 8 is then attached to and extends along the speaker membrane 2 and projects away therefrom substantially perpendicular, i.e. in longitudinal direction.

As will be understood, in an even further embodiment the support member 5 may extend between the first and second drive member, the first and third drive member, and the second and third drive member to further improve force distribution along the speaker membrane 2.

The present invention has been described above with reference to a number of exemplary embodiments as shown in the drawings. Modifications and alternative implementations of some parts or elements are possible, and are included in the scope of protection as defined in the appended claims.

The invention claimed is:

1. A speaker transducer, comprising:

a speaker membrane;

two drive members connected to an outer membrane circumference of the speaker membrane for driving the speaker membrane; and a substantially rigid support member connected to each of the two drive members and extending there between, wherein the support member is connected to and extends along the speaker membrane, wherein the support member comprises one or more fin portions extending between the two drive members, and wherein each fin portion is attached to the speaker membrane and projects away therefrom substantially perpendicular.

2. The speaker transducer of claim 1, wherein each of the two drive members is a ring shaped drive member, and wherein an outer driver circumference of each ring shaped drive member is connected to the outer membrane circumference of the speaker membrane.

3. The speaker transducer of claim 2, wherein the support member comprises a plurality of the fin portions, and wherein the plurality of the fin portions form a parallel extending arrangement of fin portions.

4. The speaker transducer of claim 3, wherein two fin portions of the plurality of the fin portions are spaced apart at a separation distance which is equal to or larger than a diameter of the outer driver circumference of each drive member.

5. The speaker transducer of claim 1, wherein the two drive members are oppositely arranged along the outer membrane circumference.

6. The speaker transducer of claim 1, wherein the support member extends along one or both sides of the speaker membrane.

7. The speaker transducer of claim 1, wherein each fin portion has a fin height, as measured from the speaker membrane, wherein the fin height is at least three times a thickness of the speaker membrane.

8. The speaker transducer of claim 1, wherein each fin portion is a straight fin portion.

9. The speaker transducer of claim 1, wherein each fin portion extends from a first circumferential part of the outer membrane circumference to a second circumferential part of the outer membrane circumference.

10. The speaker transducer of claim 1, wherein one fin portion of the one or more fin portions extends through a center point of the speaker membrane.

11. The speaker transducer of claim 1, wherein each of the two drive members comprises a voice coil or a permanent magnet for interaction with a complementary voice coil or permanent magnet respectively.

12. The speaker transducer of claim 11, wherein each of the two drive members comprises a voice coil, and wherein the two voice coils are connected through a wired connection extending along the support member.

13. The speaker transducer of claim 1, wherein the support member and the speaker membrane are integrally formed.

14. The speaker transducer of claim 1, wherein the speaker membrane and the two drive members are arranged in a substantially flat shaped volume.

* * * * *